United States Patent
Jia

(10) Patent No.: US 8,742,985 B1
(45) Date of Patent: Jun. 3, 2014

(54) ULTRA LOW POWER GLOBAL NAVIGATION SATELLITE SYSTEM (GNSS) RECEIVER OPERATION

(75) Inventor: Zhike Jia, Fremont, CA (US)

(73) Assignee: Marvell International Ltd. (BM)

( * ) Notice: Subject to any disclaimer, the term of this patent is extended or adjusted under 35 U.S.C. 154(b) by 185 days.

(21) Appl. No.: 13/005,709

(22) Filed: Jan. 13, 2011

Related U.S. Application Data

(60) Provisional application No. 61/372,380, filed on Aug. 10, 2010.

(51) Int. Cl.
*G01S 19/34* (2010.01)
(52) U.S. Cl.
USPC .................................................. 342/357.74
(58) Field of Classification Search
USPC ............... 342/357.74, 357.76; 701/474, 490; 455/343.1–343.5
See application file for complete search history.

(56) References Cited

U.S. PATENT DOCUMENTS 6,133,871 A * 10/2000 Krasner ................... 342/357.74
8,188,917 B2 * 5/2012 Gronemeyer et al. ... 342/357.74

* cited by examiner

*Primary Examiner* — Cassie Galt

(57) ABSTRACT

Apparatuses, methods, and other embodiments associated with ultra low power GNSS receiver operation are described. According to one embodiment, an apparatus that supports an off-line mode includes receive hardware configured to receive global navigation satellite system (GNSS) signals, and a memory to store the digitized GNSS signals received by the receive hardware. The apparatus also includes a result logic configured to produce a GNSS result from the digitized GNSS signals stored in the memory and a clock configured to provide a timing signal. The apparatus also includes a control logic configured to control combinations of power states of the receive hardware, the memory, and the result logic based, at least in part, on the timing signal.

16 Claims, 4 Drawing Sheets

ULTRA LOW POWER GLOBAL NAVIGATION SATELLITE SYSTEM (GNSS) RECEIVER OPERATION

CROSS REFERENCE TO RELATED APPLICATIONS

This application claims the benefit of U.S. provisional application Ser. No. 61/372,380 filed on Aug. 10, 2010, which is hereby wholly incorporated by reference.

BACKGROUND

Global positioning system (GPS) apparatuses rely on a space-based global navigation satellite system (GNSS). GNSS satellite vehicles (SV) broadcast signals from space. GPS receivers use the SV signals to calculate three dimensional (3D) locations (e.g., latitude, longitude, altitude) and/or the current time.

A GPS has three basic components—absolute location, relative movement, and time transfer. A GPS receiver calculates its position by precisely timing the signals sent by GNSS satellites. The GNSS satellites send signals that include the time the message was sent, precise orbital information (the ephemeris), and general system health with rough orbits of the GNSS satellites (the almanac). Receivers use the messages received to determine the message transit times and thus to compute the distance to satellites.

GNSS SVs continuously broadcast a navigation message at a rate of 50 bits/second. A complete message is composed of 25 full frames. Each frame is 30 seconds arranged as distinct groupings of 1,500 bits of information. Frames can then be further subdivided into 5 subframes of length 6 seconds and with 300 bits each. Thirty second frames begin precisely on the minute or half minute as indicated by the atomic clock on the satellite. Since conventional satellites continuously broadcast, conventional receivers typically continuously receive and continuously update solutions.

SUMMARY

In one embodiment an apparatus includes receive hardware configured to receive global navigation satellite system (GNSS) signals, and a memory to store the digitized GNSS signals received by the receive hardware. The apparatus also includes a result logic configured to produce a GNSS result from the digitized GNSS signals stored in the memory and a clock configured to provide a timing signal. The apparatus also includes a control logic configured to control combinations of power states of the receive hardware, the memory, and the result logic based, at least in part, on the timing signal. The combination of power states includes: the receive hardware being in a powered up state and the result logic being in a powered down state, the receive hardware being in a powered down state and the result logic being in a powered up state, and the receive hardware being in a powered down state, the result logic being in a powered down state, and the receive hardware being scheduled to enter a powered up state at a pre-determined time point in the future.

In another embodiment, a method for controlling a global navigation satellite system (GNSS) receiver is provided. The method includes, in response to receiving a wakeup signal from a wakeup logic, powering up radio frequency (RF) signal receiving circuitry in the GNSS receiver to a state suitable for receiving GNSS signals and powering up a memory in the GNSS receiver to a state suitable for storing digitized GNSS signal data. The method also includes for a pre-determined time, collecting GNSS signals, pre-processing the GNSS signals into jammer free digitized GNSS signal data, and storing the GNSS signal data in the memory. The method also includes powering down the RF signal processing circuitry and powering up an acquisition logic in the GNSS receiver to a state suitable for performing a GNSS acquisition function on the GNSS signal data stored in the memory and controlling the acquisition logic to perform the GNSS acquisition function to produce an acquisition data, and powering down the acquisition logic. The method also includes powering up a tracking logic in the GNSS receiver to a state suitable for performing a GNSS tracking function on one or more of, the GNSS signal data stored in the memory and the acquisition data, and controlling the tracking logic to perform the GNSS tracking function to produce a tracking data and powering down the tracking logic. The method also includes powering up a position/velocity/time (PVT) logic in the GNSS receiver to a state suitable for producing a PVT value from one or more of, the GNSS signal data stored in the memory, the acquisition data, and the tracking data and controlling the PVT logic to produce the PVT value, where the PVT value is produced from a block of digitized GNSS signal and powering down the PVT logic. The method also includes powering down the memory and configuring the wakeup logic to provide a subsequent wakeup signal at a pre-defined point in time in the future.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are example apparatuses and methods associated with ultra low power GNSS receiver operation. A GNSS apparatus may be configured with several functional blocks. Some blocks are used to acquire data (e.g., position data, time data). Other blocks are used to process that data. Data collection and data processing can be performed as separate processes or in separate circuits or logics. Therefore, the processing units may not need to be operable during a data collection stage and the data acquisition units may not need to be operable during a data processing stage. Furthermore, both the data collection and the data processing blocks may be turned off at the same time to save power.

Example apparatuses and methods periodically power on and power off different blocks to save power when compared to embodiments that leave all the blocks on all the time. This ultra low power mode of GPS receiver operation may be referred to as an "off-line mode". Example apparatuses and methods may perform different processing (e.g., position fixing only, time maintenance only,) at different times. In one embodiment, if there is a PVT output rate requirement, on/off scheduling may be performed to achieve the desired PVT output rate. For example, if the desired output refresh rate is 1/64 Hz, then example apparatuses and methods may be turned on at least once every 64 seconds. Even if there is no desired PVT output rate, example apparatuses and methods may still periodically power up to collect and process GNSS data that facilitates reducing uncertainty in future processing. Calculating a PVT solution even when there is no PVT output requirement facilitates calibrating the local clock to narrow down time/position uncertainty for a subsequent power up.

In one embodiment, an input sample format may be 2 bits per I/Q sample and the sampling rate may be 2.048 MHz. The I/Q sample refers to the number of bits in the I sample compared to the number of bits in the Q sample. Two carrier waves represent the I and Q components of the received signal. Individually each of these signals can be represented as:

$$I = A * \cos(\Phi)$$

$$Q = A * \sin(\Phi)$$

where the signal I is the "in-phase" component and the signal Q is the "quadrature" component. Note that these are represented as sin and cos because the two signals are 90° out of phase with one another.

Figure 1:
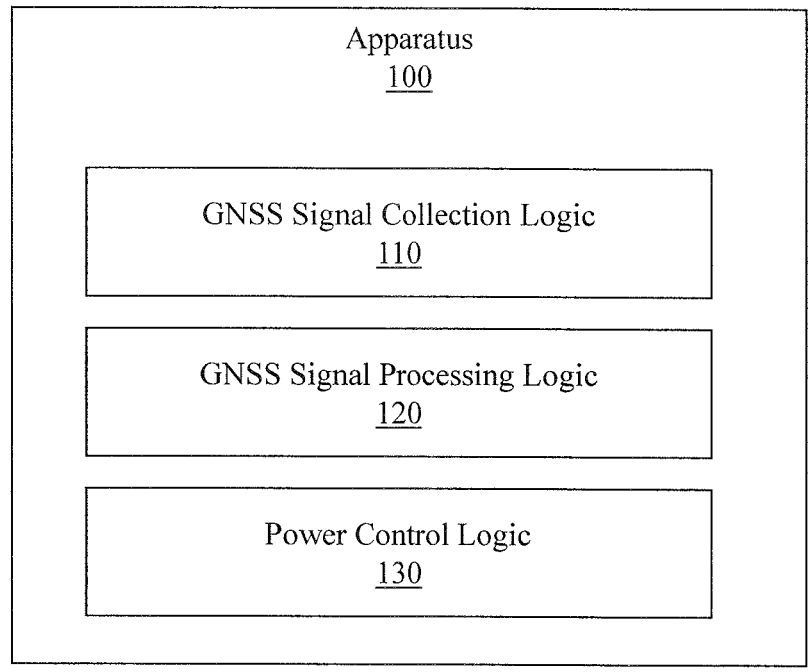
FIG. 1 illustrates one embodiment of an apparatus configured to operate in different power modes including an ultra low power GNSS receiver operation mode.

FIG. 1 illustrates one embodiment of an apparatus 100 that is configured to operate in different power modes including an ultra low power GNSS receiver operation mode. The apparatus 100 includes a GNSS signal collection logic 110, a GNSS signal processing logic 120, and a power control logic 130.

The GNSS signal collection logic 110 receives GNSS signals and prepares them for data processing by the GNSS signal processing logic 120. Receiving and preparing the GNSS signals can include frequency down conversion from radio frequency to low IF frequency, jammer detection and removal, digitization (ADC) and so on. Data processing the signals can include performing acquisition, tracking, and PVT functions. In one embodiment, acquisition, tracking, and PVT are done in sequence, where a later process relies on the results from a previous process. In offline mode, acquisition and tracking process the same block of pre-collected samples. In one embodiment, the switch between continuous mode and offline mode can be done on the fly without having to restart the apparatus 100. In one embodiment, when the apparatus 100 is in offline mode, the apparatus 100 uses the same memory that is used during continuous mode by reconfiguring the memory structure on the fly.

The power control logic 130 is configured to control the GNSS signal collection logic 110 to be powered down while the GNSS signal processing logic 120 is powered up and to control the GNSS signal processing logic 120 to be powered down while the GNSS signal collection logic 110 is powered up. Selectively having only the signal collection logic 110 or the signal processing logic 120 powered up facilitates saving power as compared to having both logics powered up at the same time. Simply alternating power up and power down between the GNSS signal collection logic 110 and the GNSS signal processing logic 120 would provide power savings over conventional systems.

However, in one embodiment, the power control logic 130 is further configured to selectively power down both the GNSS signal collection logic 110 and the GNSS signal processing logic 120 to facilitate saving even more power. The signal collection logic 110 and the signal processing logic 120 are configured to be powered up periodically. If both logics were left off indefinitely, then the apparatus 100 would likely provide a sub-optimal GPS PVT result. Therefore, the power control logic 130 is configured to schedule the GNSS signal collection logic 110 to be powered up at a pre-determined time, to receive signals, and to be powered down. Additionally the power control logic 130 is configured to schedule the GNSS signal processing logic 120 to be powered up, to process signals, to update a PVT solution, and to be powered down. Being able to power down both the GNSS signal processing logic 120 and the GNSS signal collection logic 110 facilitates saving even more power over conventional systems. In one embodiment, the pre-determined time at which the GNSS signal processing logic 120 is to be powered up can be computed to align with a desired GPS time and/or to satisfy a PVT refresh rate.

Figure 2:
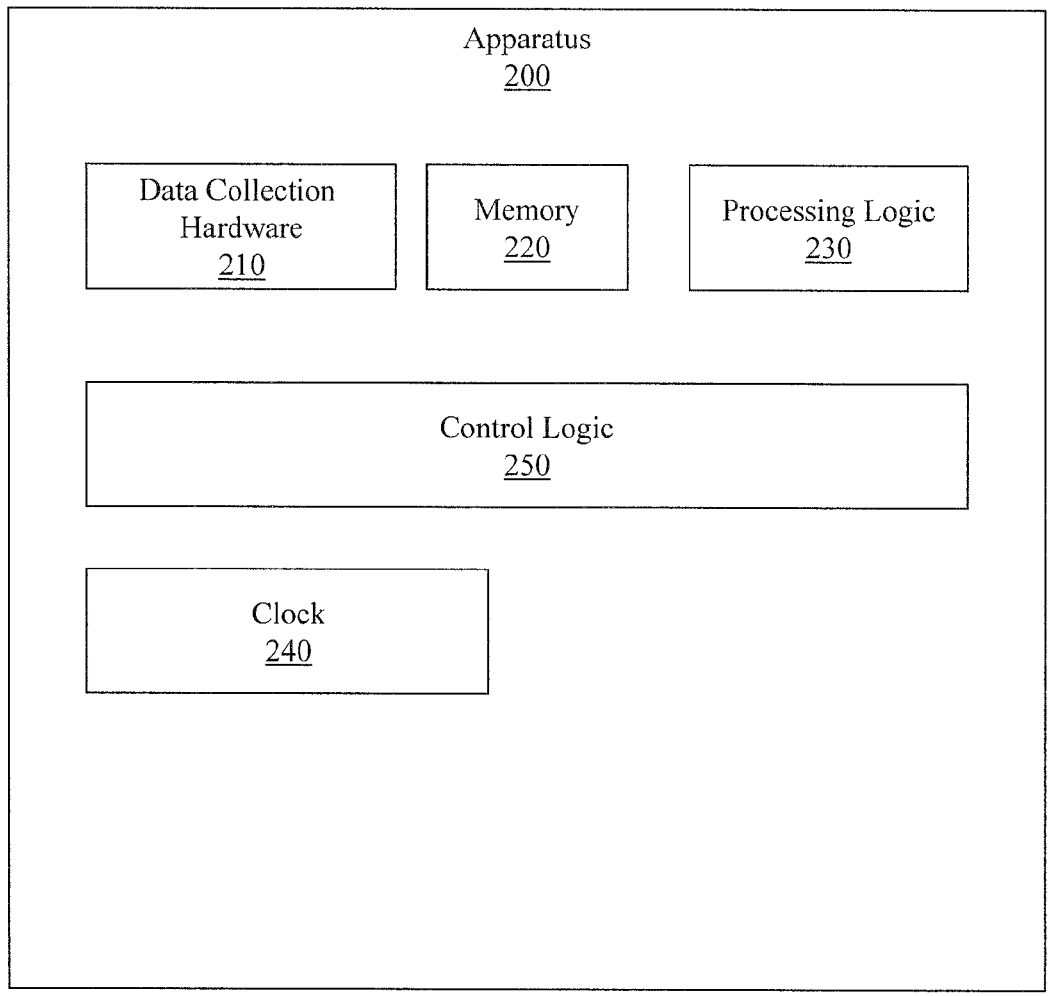
FIG. 2 illustrates one embodiment of an apparatus configured to operate in different power modes including an ultra low power GNSS receiver operation mode.

FIG. 2 illustrates one embodiment of an apparatus 200 configured to operate in different power modes including an off-line ultra low power GNSS receiver operation mode. Apparatus 200 includes data collection hardware 210, memory 220, a processing logic 230, a clock 240, and a control logic 250.

The data collection hardware 210 is configured to receive GNSS signals. The GNSS signals may be, for example, GPS signals provided according to a code division multiple access (CDMA) spread-spectrum technique that modulates SV signals onto an L1 carrier frequency and an L2 carrier frequency. The L1 frequency (1575.42 MHz) signal carries navigation messages and the standard positioning service (SPS) code signals. The L2 frequency (1227.60 MHz) is used to measure the ionospheric delay by precise positioning service (PPS) equipped receivers.

Memory 220 is configured to store GNSS signals received by the data collection hardware 210. Since the data collection hardware 210 will be selectively powered up and down, the memory 220 does not need to be as large as conventional memories that need to be able to store a continuously arriving data stream. Instead, memory 220 can be sized and designed to accommodate just enough GNSS signals to satisfy a desired PVT refresh rate. Thus memory 220 may be smaller, require less power, and be less expensive than conventional GNSS receiver memories. One example memory sizing technique is described in the provisional application from which this application claims priority.

Processing logic 230 is configured to produce a GNSS result from GNSS signals stored in the memory. The GNSS result may be, for example, a position, a velocity, a time, or combinations thereof. Clock 240 is configured to provide a timing signal that can be used to control when other elements of apparatus 200 are powered up and powered down.

Control logic 250 is configured to control combinations of power states of the data collection hardware 210, the memory 220, and the processing logic 230. In one embodiment, the control logic 250 controls the power states based, at least in part, on the timing signal provided by clock 240. To facilitate saving different amounts of power by operating in different modes, the control logic 250 may be configured to control different combinations of power states. In one embodiment, the combination of power states includes (i) the data collection hardware 210 being in a powered up state and the processing logic 230 being in a powered down state, (ii) the data collection hardware 210 being in a powered down state and the processing logic 230 being in a powered up state, and (iii) the data collection hardware 210 being in a powered down state, the processing logic 230 being in a powered down state, and the data collection hardware 210 being scheduled to enter a powered up state at a pre-determined point in the future. The pre-determined time point in the future can be computed to satisfy a PVT refresh rate. The provisional application from which this application claims priority provides detailed examples of various combinations of power modes.

The control logic 250 may be configured to control the combination of power states to control the apparatus 200 power consumption to be fifty percent less, to be ninety percent less, or even to be up to ninety-nine percent less than the apparatus 200 power consumption would be if the data collection 210, the memory 220, and the processing logic 230 were continuously and simultaneously in a powered up state. While specific percentages are described, it will be appreciated that different combinations of power states and different schedules can be employed to achieve different power savings rates.

In one embodiment, the clock 240 is a real time clock (RTC) and the control logic 250 is configured to control the combination of power sates according to a schedule configured to satisfy a refresh rate and a power saving percentage. The schedule is maintained with reference to a real time clock signal provided by the RTC 240. While a real time clock 240 may suffice for scheduling, clock signals with much higher frequencies may be required by the data collection hardware 210. Thus, as described below, the data collection hardware 210 may include an TCXO (temperature compensated crystal).

Figure 3:
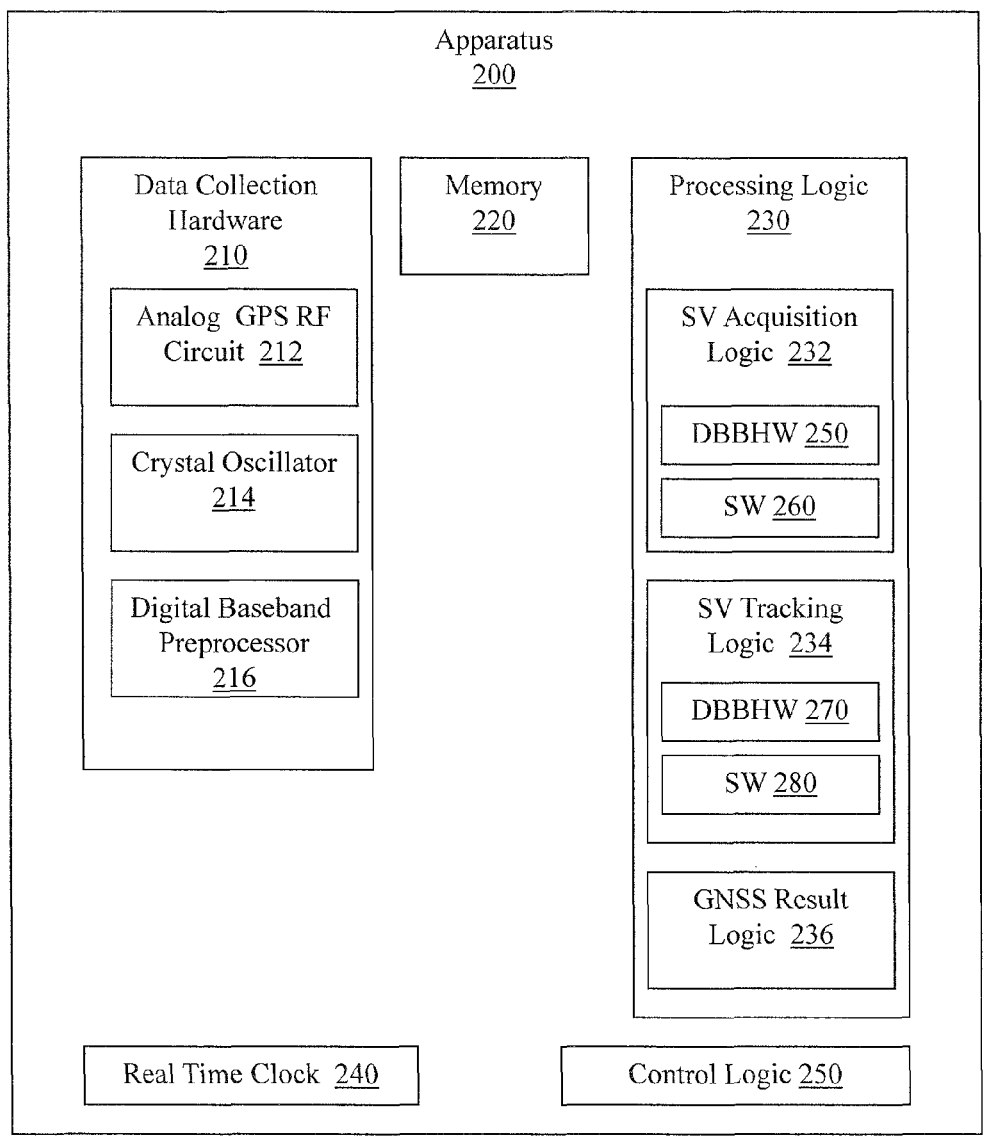
FIG. 3 illustrates one embodiment of an apparatus configured to operate in different power modes including an ultra low power GNSS receiver operation mode.

FIG. 3 illustrates additional detail for one embodiment of apparatus 200. In this embodiment, the data collection hardware 210 may include an analog GPS radio frequency (RF) circuit 212, a TXCO 214, and a digital baseband (BB) pre-processor 216. The digital BB pre-processor 216 may be configured to perform actions including, but not limited to, jammer removal, converting an input signal from a first frequency to a second frequency, and converting an input analog signal to a number of bits per I/Q.

In this embodiment, the processing logic 230 is illustrated having a satellite vehicle (SV) acquisition logic 232, an SV tracking logic 234, and a GNSS result logic 236.

The SV acquisition logic 232 is configured to produce an acquisition result by processing the GNSS signals stored in the memory 220. Unlike conventional systems whose acquisition logics may be relying on continuous input signal samples, the SV acquisition logic 232 may need to undertake non-conventional processing to achieve and maintain acquisition based on limited pre-collected data samples. In one embodiment, the SV acquisition logic 232 includes digital BB hardware 250 and software 260. Example detailed digital BB hardware 250 and software 260 configurations are illustrated in the provisional application to which this application claims priority.

In one example, the SV acquisition logic 232 includes a coarse acquisition logic, a side lobe check logic, and a confirmation logic. Through acquisition, the code phase and Doppler frequency of the received signal are aligned with the local replica. However, the error of the alignment is still significant. For example, the code phase error may be up to quarter chip while the carrier frequency error can be several tens of Hertz.

Unlike conventional systems that are continuously on, the SV acquisition logic 232 may be configured to maintain state information associated with previous fixes and calculations. The state information may include, but is not limited to including, the identity of an SV previously acquired, a frequency uncertainty associated with a previously acquired SV, a code phase uncertainty associated with a previously acquired SV, and a bit boundary uncertainty associated with a previously acquired SV. Since the SV acquisition logic 232 is being powered on and off, the SV acquisition logic 232 may not have a continuous fix on SVs and may need to repeatedly acquire SVs. Rather than start from scratch on each power up cycle, the SV acquisition logic 232 may be configured to select an SV to acquire based, at least in part, on the state information.

The SV tracking logic 234 is configured to produce a tracking result by processing GNSS signals stored in the memory 220. In one embodiment, the SV tracking logic 234 includes digital BB hardware 270 and software 280. Example digital BB hardware 270 and software 280 configurations are illustrated in the provisional application to which this application claims priority. Once again, unlike conventional systems whose tracking logic may be continuously on and that may have continuously updated data, the SV tracking logic 234 may only process pre-collected samples. Since the SV acquisition logic 232 is repeatedly acquiring SVs in short acquisition windows, in one embodiment the SV tracking logic 234 may be configured to refine measurements. The refining can include, but is not limited to, refining a carrier frequency measurement, refining a code phase measurement, refining a chip phase measurement, and refining the accuracy of a pseudorange.

The GNSS result logic 236 is configured to produce a GNSS result data by processing one or more of, the GNSS signals stored in the memory 220, the acquisition result produced by the SV acquisition logic 232, and the tracking result produced by the SV tracking logic 234. The final result data may represent, for example, an absolute location, a relative movement, a time value, and a position/velocity/time (PVT) result.

Figure 4:
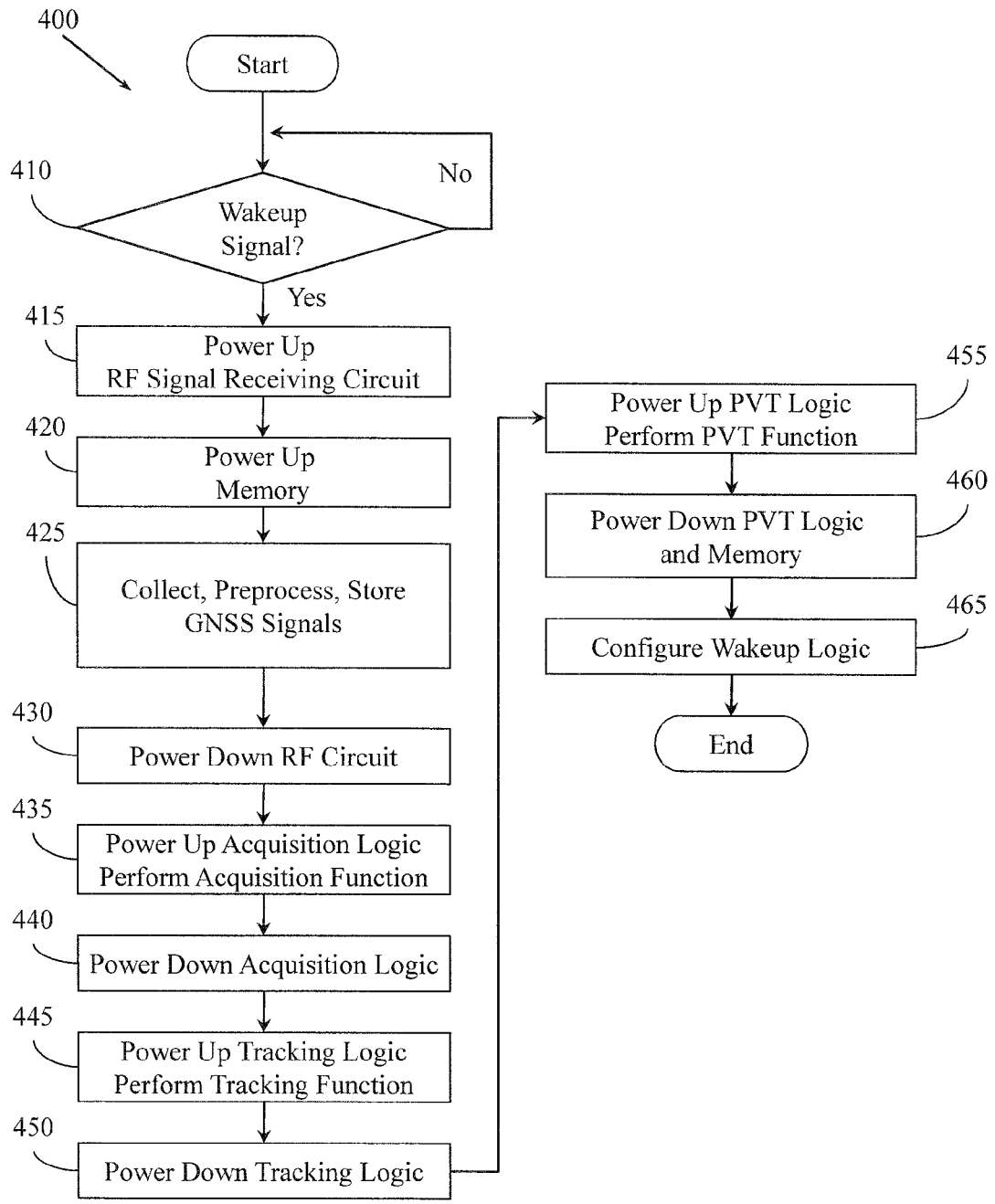
FIG. 4 illustrates one embodiment of a method configured to control a GNSS receiver to operate in different power modes including an ultra low power GNSS receiver operation mode.

FIG. 4 illustrates one embodiment of a method 400 configured to control a GNSS receiver to operate in different power modes including an ultra low power GNSS receiver operation mode.

Method 400 includes, at 410, determining whether a wakeup signal has been received from a wakeup logic. If the determination at 410 is no, the method 400 will continue to wait until a wakeup signal is received. At 415, in response to receiving a wakeup signal from a wakeup logic, method 400 includes powering up radio frequency signal receiving circuitry in the GNSS receiver to a state suitable for receiving GNSS signals. In one example, powering up the RF signal receiver circuitry at 415 comprises powering up elements including, but not limited to, an oscillating crystal, a central processing unit, digital baseband preprocessing logic, and analog RF circuits.

Method 400 also includes, at 420, powering up a memory in the GNSS receiver to a state suitable for storing GNSS signal data.

At 425, method 400 includes collecting GNSS signals for a pre-determined period of time, pre-processing the GNSS signals into GNSS signal data, and storing the GNSS signal data in the memory. Since the GNSS signals are only acquired for a pre-determined period of time, the memory can be smaller than in conventional systems and the signal receiving components can be powered down after acquisition. Once a phase of collecting and processing GNSS signals is complete, the memory can be powered down and the previously acquired GNSS signals deleted or allowed to degrade.

Therefore, method 400 includes, at 430, powering down the RF signal receiving circuitry. With the RF signal receiving circuitry powered down, method 400 proceeds, at 435, with powering up an acquisition logic in the GNSS receiver to a state suitable for performing a GNSS acquisition function on the GNSS signal data stored in the memory. With the acquisition logic powered up, the acquisition logic is controlled to perform the GNSS acquisition function to produce an acquisition data.

In one example, the acquisition function includes performing actions including, but not limited to, coarse acquisition, side lobe checking, and confirmation. To handle the intermittent nature of the data, the method 400 maintains state information concerning attributes including, but not limited to, the identity of an SV previously acquired, a frequency uncertainty associated with a previously acquired SV, a code phase uncertainty associated with a previously acquired SV, and a bit boundary uncertainty associated with a previously acquired SV. Method 400 includes configuring the acquisition function to select an SV to acquire based, at least in part, on the state information.

After the acquisition result is produced, method 400 proceeds, at 440, with powering down the acquisition logic. After the acquisition logic is powered down, the next components can be powered up.

Therefore, method 400 proceeds, at 445, with powering up a tracking logic in the GNSS receiver to a state suitable for performing a GNSS tracking function on one or more of, the GNSS signal data stored in the memory, and the acquisition results, which are an initial tracking configuration of tracking. With the tracking logic powered up, the tracking logic can be controlled to perform the GNSS tracking function to produce a tracking data. In one example, the tracking function includes performing actions including, but not limited to, refining a carrier frequency measurement, refining a code frequency measurement, refining a chip phase measurement, and refining the accuracy of a pseudorange.

At 450, the tracking logic is powered down and then, at 455, a position/velocity/time (PVT) logic in the GNSS receiver is powered up to a state suitable for producing a PVT value from the tracking result data. With the PVT logic powered up, the method then controls the PVT logic to produce the PVT value. At 460, the PVT logic is powered down.

The actions described from action 410 to action 460 describe one cycle through an acquisition, tracking, and PVT solution phase. During the phase, selected components are powered up and powered down. After the phase, the components can all be powered down, so long as a mechanism is provided to begin another phase. Powering down all the components defines the ultra low power mode of GPS receiver operation by implementing the off-line mode. Therefore, method 400 also includes, at 465, configuring the wakeup logic to provide a subsequent wakeup signal at a pre-defined point in time in the future. In one example, the pre-determined period of time is selected to cause the GNSS receiver to consume at least fifty percent less power than the GNSS receiver would consume if left in a powered up state. In one example, the method includes configuring the wakeup logic to provide the wakeup signal within a time period defined by a refresh rate.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   receive hardware configured to receive global navigation satellite system (GNSS) signals, wherein the receive hardware includes a digital baseband (BB) pre-processor, an analog GPS radio frequency (RF) circuit and a crystal oscillator, wherein the digital BB pre-processor is configured to generate digitized GNSS signals from the received GNSS signals by processing the received GNSS signals with a set of pre-processing functions, and wherein the set of pre-processing functions includes jammer removal, converting an input signal from a first frequency to a second frequency, and converting an input signal from a first number of bits per I/Q to a second number of bits per I/Q to generate the digitized GNSS signals from the received GNSS signals;

a memory to store the digitized GNSS signals;

a result logic configured to produce a GNSS result from the digitized GNSS signals stored in the memory;

a clock configured to provide a timing signal; and a control logic configured to control combinations of power states of the receive hardware, the memory, and the result logic based, at least in part, on the timing signal, wherein the combination of power states includes:

(i) the receive hardware being in a powered up state and the result logic being in a powered down state, (ii) the receive hardware being in a powered down state and the result logic being in a powered up state, and (iii) the receive hardware being in a powered down state, the result logic being in a powered down state, and the receive hardware being scheduled to enter a powered up state at a pre-determined time point.

2. The apparatus of claim 1, wherein the control logic is configured to control the combination of power states to control a power consumption of the apparatus to be fifty percent less than the power consumption when the receive hardware and control logic are continuously and simultaneously in a powered up state.

3. The apparatus of claim 1, wherein the result logic comprises:

a satellite vehicle (SV) acquisition logic configured to produce an acquisition result by processing the digitized GNSS signals stored in the memory;

an SV tracking logic configured to produce a tracking result by processing the digitized GNSS signals stored in the memory; and a GNSS result logic configured to produce a GNSS result by processing the tracking result, wherein the acquisition result, the tracking result, and the GNSS result are produced sequentially.

4. The apparatus of claim 3, wherein the GNSS result represents one or more of: an absolute location, a relative movement, a time value, and a position/velocity/time (PVT) result.

5. The apparatus of claim 3, wherein the SV acquisition logic comprises digital baseband hardware and software and the SV tracking logic comprises digital baseband hardware and software, and wherein the SV tracking logic is configured to produce the tracking result by:

refining a carrier frequency measurement, refining a code phase measurement, refining a chip phase measurement, and refining the accuracy of a pseudo-range using the digitized GNSS signals.

6. The apparatus of claim 3, wherein:

the SV acquisition logic comprises a coarse acquisition logic, a side lobe check logic, and a confirmation logic;

the SV acquisition logic is configured to maintain state information that includes an identity of an SV previously acquired, a frequency uncertainty associated with a previously acquired SV, a code phase uncertainty associated with a previously acquired SV, and a bit boundary uncertainty associated with a previously acquired SV, and the SV acquisition logic is configured to select an SV to acquire based, at least in part, on the state information.

7. The apparatus of claim 1, further comprising:

tracking logic configured to repeatedly process a same pre-collected block of samples from the digitized GNSS signals in the memory with different local carrier frequencies and code phase replicas to provide tracking results, acquisition logic configured to repeatedly process a same pre-collected block of samples from the digitized GNSS signals in the memory with different local carrier frequencies and code phase replicas to provide acquisition results, wherein the result logic is configured to process the same pre-collected block of samples with state information from previous determinations of the acquisition and tracking results.

8. The apparatus of claim 7, wherein the tracking logic is configured to perform tracking a change of Doppler frequency, refining a carrier frequency measurement, refining a code frequency measurement, refining a chip phase measurement, and refining the accuracy of a pseudorange.

9. The apparatus of claim 1, wherein:

the clock comprises a real time clock (RTC) and the control logic is configured to control the combination of power states according to a schedule configured to satisfy a refresh rate and a power saving percentage.

10. A method comprising:

receiving, with at least a receiver that includes a digital baseband processor and a crystal oscillator, navigation signals from a satellite system;

generating and storing, by the receiver in a memory, digitized navigation signals from the received navigation signals by using the digital baseband processor to perform a set of pre-processing functions on the navigation signals, wherein the set of pre-processing functions includes jammer removal, converting an input signal from a first frequency to a second frequency, and converting an input signal from a first number of bits per I/Q to a second number of bits per I/Q to generate the digitized GNSS signals from the received GNSS signals;

producing, with a result logic, a navigation result from the digitized navigation signals stored in the memory; and controlling combinations of power states of at least the receiver, the memory and the result logic based, at least in part, on the timing signal, wherein controlling the combination of power states includes at least:

controlling the receiver to be in a powered up state and the result logic to be in a powered down state.

11. The method of claim 10, wherein producing the navigation result includes:

producing an acquisition result by repeatedly processing the same digitized navigation signals stored in the memory;

producing a tracking result by repeatedly processing the same digitized navigation signals stored in the memory; and producing the navigation result by repeatedly processing the tracking result.

12. The method of claim 10, wherein generating the digitized navigation signals includes converting global navigation satellite system signals to digital form.

13. The method of claim 10, wherein controlling the combination of power states includes:

controlling the receiver to be in a powered down state and the result logic to be in a powered up state, and controlling the receiver to be in a powered down state, the result logic to be in a powered down state, and scheduling the receiver to enter a powered up state at a predetermined time.

14. The method of claim 10, wherein producing the navigation result includes repeatedly processing a same pre-collected block of samples from the digitized navigation signals with different local carrier frequencies and code phase replicas to provide acquisition results and tracking results, wherein producing the navigation result includes using the same pre-collected block of samples with state information from previous determinations of the acquisition and tracking results.

15. An apparatus, comprising:

receive hardware configured to receive global navigation satellite system (GNSS) signals, wherein the receive hardware includes a digital baseband (BB) pre-processor, an analog GPS radio frequency (RF) circuit and a crystal oscillator, wherein the digital BB pre-processor is configured to generate digitized GNSS signals from the received GNSS signals by processing the GNSS signals with a set of pre-processing functions, and wherein the set of pre-processing functions includes jammer removal, converting an input signal from a first frequency to a second frequency, and converting an input signal from a first number of bits per I/Q to a second number of bits per I/Q to generate the digitized GNSS signals from the received GNSS signals;

a memory to store the digitized GNSS signals;

a result logic configured to produce a GNSS result by repeatedly processing the digitized GNSS signals in the memory with different local carrier frequencies and code phase replicas to provide acquisition results and tracking results; and a control logic configured to control combinations of power states of the receive hardware, the memory, and the result logic, wherein the combination of power states includes selectively powering the receive hardware and the result logic at different times.

16. The apparatus of claim 15, wherein the result logic is configured to process the digitized GNSS signals with state information from previous determinations of the acquisition results and the tracking results, and wherein the GNSS result includes a position/velocity/time (PVT) result.

* * * * *